United States Patent [19]

Sun et al.

[11] Patent Number: 5,565,245
[45] Date of Patent: Oct. 15, 1996

[54] MAGNESIUM DOPED β-ALUMINUM TITANATE THIN FILM COATING

[75] Inventors: Tawei Sun, Kaohsiung, Taiwan; Nancy R. Brown; Jesse J. Brown, Jr., both of Christiansburg, Va.; Min Kang, Sandersville, Ga.

[73] Assignee: Virginia Tech Intellectual Properties, Inc., Blacksburg, Va.

[21] Appl. No.: 396,242

[22] Filed: Mar. 1, 1995

Related U.S. Application Data

[63] Continuation-in-part of Ser. No. 98,202, Jul. 28, 1993, Pat. No. 5,407,479.

[51] Int. Cl.$^6$ ........................................... B05D 1/18
[52] U.S. Cl. .................. 427/430.1; 427/226; 106/286.2; 106/286.4; 106/286.5; 501/127; 501/128; 501/131; 501/134; 501/136
[58] Field of Search ................................. 427/226, 430.1; 501/127, 134, 128, 135, 131, 136; 106/287.19, 286.2, 286.4, 286.5

[56] References Cited

U.S. PATENT DOCUMENTS

| | | | |
|---|---|---|---|
| 5,008,222 | 4/1991 | Kameda | 501/127 |
| 5,153,153 | 10/1992 | Freudenberg et al. | 501/127 |
| 5,407,479 | 4/1995 | Sun et al. | 106/287.19 |

OTHER PUBLICATIONS

Prasadarao et al., "Enhanced Densification by Seeding of Sol–Gel–Derived Aluminum Titanate", J. Am. Ceram. Soc., 75(6) 1529–33 (1992).

*Primary Examiner*—Michael Lusignan
*Assistant Examiner*—David M. Maiorana
*Attorney, Agent, or Firm*—Whitham, Curtis, Whitham & McGinn

[57] ABSTRACT

$Mg_xAl_{2-2x}Ti_{1+x}O_5$ ($x \leq 0.2$) protective coatings have been developed for both dense and porous substrates, such as SiC and $Si_3N_4$, using a chemical solution processing method involving the hydrolysis and condensation of magnesium, aluminum and titanium precursors. The solution viscosities, pH values, $H_2O$/alkoxide molar ratios, and dip coating withdrawal rates which are optimum for crack-free $Mg_xAl_{2-2x}Ti_{1+x}O_5$ ($x \leq 0.2$) are 1.0 to 6.2 cP, pH 1–4.5, molar ratio 1.5–10, and withdrawal rate of 2.2–8.0 cm/min, respectively. Conversion of the amorphous coating to crystalline $Mg_xAl_{2-2x}Ti_{1+x}O_5$ ($x \leq 0.2$) is achieved by a succession of calcination below 450° C. and a final heat treatment above 1000° C. for ten hours with controlled heating and cooling rates.

9 Claims, 2 Drawing Sheets

MAGNESIUM DOPED β-ALUMINUM TITANATE THIN FILM COATING

CROSS-REFERENCE TO RELATED APPLICATIONS

This patent application is a continuation-in-part (CIP) application of the patent application having Ser. No. 08/098,202 entitled "SOL-GEL β-ALUMINUM TITANATE THIN FILM COATING" filed Jul. 28, 1993, now U.S. Pat. No. 5,407,479. The text of the above-identified patent application is herein incorporated by reference.

DESCRIPTION

BACKGROUND OF THE INVENTION

1. Field of the Invention

The invention generally relates to sol-gel processes and formulations for fabricating magnesium (Mg) doped β-aluminum titanate ($Al_2TiO_5$) coatings on different dense and porous substrates.

2. Description of the Prior Art

Frequently, ceramic materials with desired high temperature mechanical properties need surface modifications to improve corrosion and/or oxidation resistance. SiC and $Si_3N_4$ are widely used high temperature structural materials for high efficiency heat engines, particulate filters, and gas turbines. The performance of SiC and $Si_3N_4$ greatly relies on the integrity of the surface oxide layer which retards further oxidation of the underlying material. Severe strength degradation has been frequently observed when the surface protective film deteriorates as a result of chemical attack. Large pits formed after exposure in hostile environments, through either active or passive oxidation, are responsible for strength reductions. Atmospheres containing oxygen, hydrogen-steam, or alkalies are known to attack both SiC and $Si_3N_4$.

SUMMARY OF THE INVENTION

It is an object of this invention to provide Mg stabilized β-$Al_2TiO_5$ having the general chemical formula $Mg_xAl_{2-2x}Ti_{1+x}O_5$ where $x \leq 0.2$, and preferably where $0.001 \leq x \leq 0.2$.

It is an object of this invention to provide a sol-gel formulation and process for fabricating magnesium doped $Al_2TiO_5$ coatings on dense and porous substrates.

It is another object of this invention to provide a sol-gel formulation and process for forming crack-free coatings of $Al_2TiO_5$ and/or Mg stabilized β-$Al_2TiO_5$ on the surface and interior sections of porous materials such as ceramic filters.

It is another object of the invention to provide a coating and method which can be used to improve the high temperature corrosion resistance of ceramics such as SiC and $Si_3N_4$ as well as be used to provide thermal insulation coatings for oxide and non-oxide based ceramics.

According to the invention, coating materials, having the compositions $Mg_xAl_{2-2x}Ti_{1+x}O_5$, where $x \leq 0.2$, have been created using a sol-gel coating process followed by calcination at temperatures below 500° C. and crystallization at temperatures above 1000° C. These coating materials are useful for both dense and porous ceramics. The coatings can be used to provide both protection against chemical attack and for thermal insulation applications.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
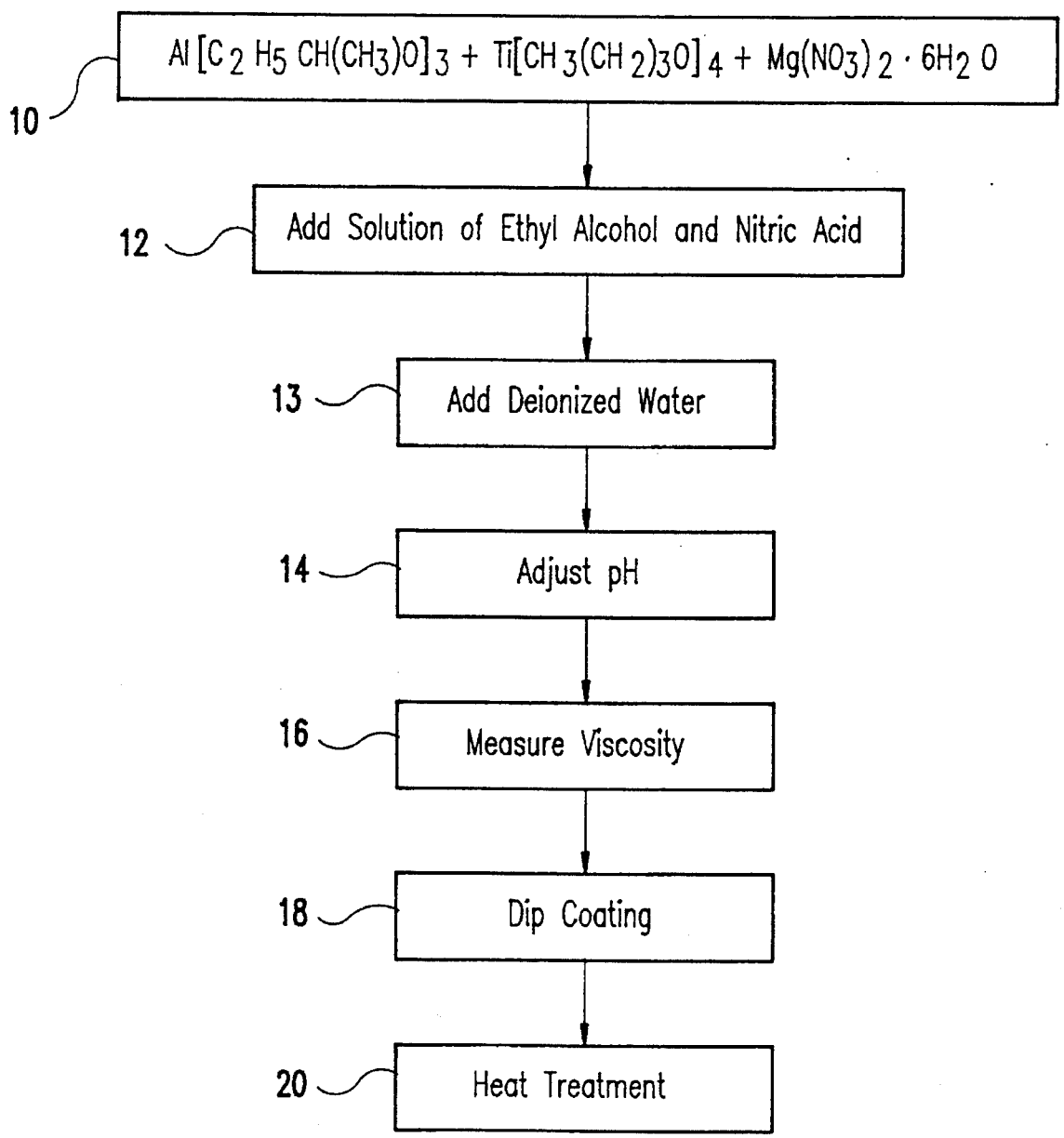
FIG. 1 is a schematic diagram showing the process for preparing and applying an $Mg_xAl_{2-2x}Ti_{1+x}O_5$ ($x \leq 0.2$) coating to a ceramic substrate.

β-$Al_2TiO_5$ is an engineering material component which is characterized by its low thermal expansion, excellent thermal shock resistance, and thermal conductivity. β-$Al_2TiO_5$ has been used in heat engines including portliners of piston heads, turbocharger linings, and insulation valves. The unique thermal expansion coefficients and thermal conductivities of β-$Al_2TiO_5$ make β-$Al_2TiO_5$ an ideal protective coating material for SiC and $Si_3N_4$, as well as an ideal thermal barrier coating material for both oxide and non-oxide based ceramics. The axial thermal expansion coefficients of β-$Al_2TiO_5$ along the crystallographic axes a, b, and c are $9.8 \times 10^{-6}$/°C., $20.6 \times 10^{-6}$/°C., and $-1.4 \times 10^{-6}$/°C., respectively. The linear thermal expansion coefficients for polycrystalline bodies are in the vicinity of $2 \times 10^{-6}$/°C., which is comparable to the thermal expansion coefficients of SiC and $Si_3N_4$. The thermal conductivity of polycrystalline $Al_2TiO_5$ is around 1.5 W/m K, which is substantially lower than the thermal conductivities of most structural ceramics. However, pure β-$Al_2TiO_5$ has a tendency to decompose at low temperatures.

It has been determined that the Mg doping of β-$Al_2O_3$ to produce a composition having the chemical formula $Mg_xAl_{2-2x}Ti_{1+x}O_5$ ($x \leq 0.2$) results in an ideal protective coating material, as well as an ideal thermal barrier coating material. In particular, it has been determined that the addition of magnesium to β-$Al_2TiO_5$ has been found to prevent the decomposition of the coating at low temperatures. The Mg stabilized β-$Al_2TiO_5$ and its method of manufacture has particular application in coating both dense and porous ceramic materials.

The Mg stabilized β-$Al_2TiO_5$ is formed using a sol-gel process wherein metal alkoxide precursors are combined together in an acidic solution. The metal alkoxide precursors preferably include 2 to 20 carbon atoms and can be ethoxides, isopropoxides, butoxides, etc., of aluminum, titanium, and magnesium. After formation of the sol-gel and coating on a substrate, the organic component of the metal oxide is removed by calcining at temperatures of preferably between 300° C. and 500° C. The magnesium component may also be supplied in the sol-gel as a hydrate or the like. The metal alkoxides and/or hydrates are dissolved in an acidified aqueous solution which preferably includes an alcohol, such as methyl alcohol, ethyl alcohol, propyl alcohol, butyl alcohol, isopropyl alcohol, ethylene glycol, etc. However, in the spirit of this invention, it is expected that other types of alcohols and/or ethers could be used in the practice of the invention. The aqueous solution is acidified to a pH between pH 1 and pH 4.5, preferably using nitric acid, although other acids could be used in the spirit of this invention, including inorganic acids, such as HCl and $H_2SO_4$, and organic acids, such as acetic acid, might also be used.

In a preferred embodiment, the raw materials used in the preparation of $Mg_xAl_{2-2x}Ti_{1+x}O_5$ ($x \leq 0.2$) solutions include magnesium nitrate hexahydrate, aluminum tri-sec butoxide, titanium butoxide, ethyl alcohol, nitric acid and deionized water. Appropriate amounts of magnesium nitrate hexahydrate, aluminum tri-sec butoxide and titanium butoxide corresponding to the stoichiometric composition of $Mg_xAl_{2-2x}Ti_{1+x}O_5$ ($x \leq 0.2$) should first be weighed and homogenized by stirring. A solution of ethyl alcohol and nitric acid with a resultant pH between 1.0 and 4.5 is then added drop by drop to the mixture of magnesium, aluminum and titanium precursors under constant stirring conditions. Deionized water, which is preferred for the hydrolysis reactions of the alkoxides, is added as the last component added to the mixture and it is added with constant stirring. The pH of the mixture should be maintained at all times between pH 1 and pH 4.5, and is preferably less than pH 2. The acidic pH prevents the gelation of the magnesium, aluminum and titanium precursors.

Table 1 shows a number of compositions of $Mg_xAl_{2-2x}Ti_{1+x}O_5$ ($x \leq 0.2$) solutions with various $H_2O$/alkoxide ratios which have been prepared according to the above process; however, it should be understood that the amounts used can easily be scaled up for industrial applications and that the ratios of materials and pH conditions can be varied within the ranges specified.

drawal rate used for both dense and porous SiC and $Si_3N_4$ are preferably less than 8.0 cm/min., and is most preferably between 2.2 and 4.1 cm/min. The withdrawal rate for other substrates (ceramics, metals, polymers, etc.) should be similar. The coated substrates should then be dried prior to being exposed to a heat treatment which converts the coating to crystalline $Mg_xAl_{2-2x}Ti_{1+x}O_5$ ($x \leq 0.2$). Drying can be accomplished by air drying in a closed container for twenty-four hours.

FIG. 1 presents the processing steps for preparing the $Mg_xAl_{2-2x}Ti_{1+x}O_5$ ($x \leq 0.2$) solution and coating it on a porous or dense ceramic substrate. In steps 10, 12 and 13, the magnesium, aluminum and titanium precursors are combined, and ethyl alcohol, nitric acid and deionized water are added. In step 14, the pH of the mixture is determined and adjusted to a level between pH 1 and pH 4.5, if required. In step 16, the viscosity of the mixture is determined and, if necessary, is adjusted to a level between 1 and 6.2 cP. Porous or dense ceramic substrates, such as SiC or $Si_3N_4$, are then dip-coated at step 18 with a controlled withdrawal rate from the mixture between 2.2 and 8.0 cm/min. After dip-coating of the substrate, the $Mg_xAl_{2-2x}Ti_{1+x}O_5$ ($x \leq 0.2$) coating is dried and then subjected to a heat treatment at step 20 to form the crystalline $Mg_xAl_{2-2x}Ti_{1+x}O_5$ ($x \leq 0.2$).

After a ceramic substrate has been dip coated with the $Mg_xAl_{2-2x}Ti_{1+x}O_5$ ($x \leq 0.2$) composition, heating is used to convert the composition to crystalline $Mg_xAl_{2-2x}Ti_{1+x}O_5$ ($x \leq 0.2$). The heat treatment should include both a low

TABLE 1

| $Al[C_2H_5CH(CH_3)O]_3$ (g) | $Ti[CH_3(CH_2)_3)O]_4$ (g) | $Mg(NO_3)_2 \cdot 6H_2O$ (g) | $H_2O$ (cm$^3$) | Ethyl alcohol (cm$^3$) | $H_2O$/alkoxide (molar ratio) |
|---|---|---|---|---|---|
| \multicolumn{6}{c}{x = 0.1} |
| 17.6 | 14.6 | 1 | 2.5 | 50 | 1.3 |
| 17.6 | 14.6 | 1 | 5 | 50 | 2.5 |
| 35.2 | 29.2 | 2 | 15 | 100 | 3.8 |
| 35.2 | 29.2 | 2 | 20 | 90 | 5 |
| 52.8 | 43.8 | 3 | 50 | 120 | 8.3 |
| 52.8 | 43.8 | 3 | 60 | 110 | 10 |
| \multicolumn{6}{c}{x = 0.15} |
| 11.1 | 10.2 | 1 | 1.5 | 30 | 1.2 |
| 11.1 | 10.2 | 1 | 3 | 30 | 2.3 |
| 22.2 | 20.4 | 2 | 12 | 50 | 4.6 |
| 22.2 | 20.4 | 2 | 15 | 50 | 5.8 |
| 33.3 | 30.6 | 3 | 36 | 70 | 9.2 |
| 33.3 | 30.6 | 3 | 39 | 70 | 10 |
| \multicolumn{6}{c}{x = 0.2} |
| 7.8 | 8.0 | 1 | 1 | 20 | 1.1 |
| 7.8 | 8.0 | 1 | 2 | 20 | 1.1 |
| 15.7 | 16 | 2 | 6 | 40 | 3.2 |
| 15.7 | 16 | 2 | 10 | 40 | 5.3 |
| 23.5 | 24 | 3 | 20 | 50 | 7 |
| 23.5 | 24 | 3 | 29 | 50 | 10 |

Following the preparation of the $Mg_xAl_{2-2x}Ti_{1+x}O_5$ ($x \leq 0.2$) solution, the solution viscosity is preferably measured according to standard methods (ASTM D445 and D446) prior to dip coating a ceramic substrate. The viscosity of the $Mg_xAl_{2-2x}Ti_{1+x}O_5$ ($x \leq 0.2$) solution optimally is controlled between 1.0 and 6.2 cP by varying the $H_2O$/alkoxide molar ratio or by aging the solution (i.e., aging results in $H_2O$ evaporation which alters the molar ratio).

Once the viscosity of the $Mg_xAl_{2-2x}Ti_{1+x}O_5$ ($x \leq 0.2$) solution is properly adjusted, substrates can be effectively dip coated. Experiments have shown the dip coating with-temperature calcining which results in evaporation of water and the organic species generated from the hydrolysis and condensation reactions, and a high temperature crystallization of the $Mg_xAl_{2-2x}Ti_{1+x}O_5$ ($x \leq 0.2$) from its amorphous counterpart. Because cracks usually form during calcination, it has been found to be advantageous to utilize slow heating to minimize drying stresses. In addition, after high temperature crystallization which takes place at approximately 1300° C. or greater, the specimens should be cooled to room temperature slowly to alleviate thermal stresses generated at the $Mg_xAl_{2-2x}Ti_{1+x}O_5$ ($x \leq 0.2$)/substrate interface.

Figure 2:
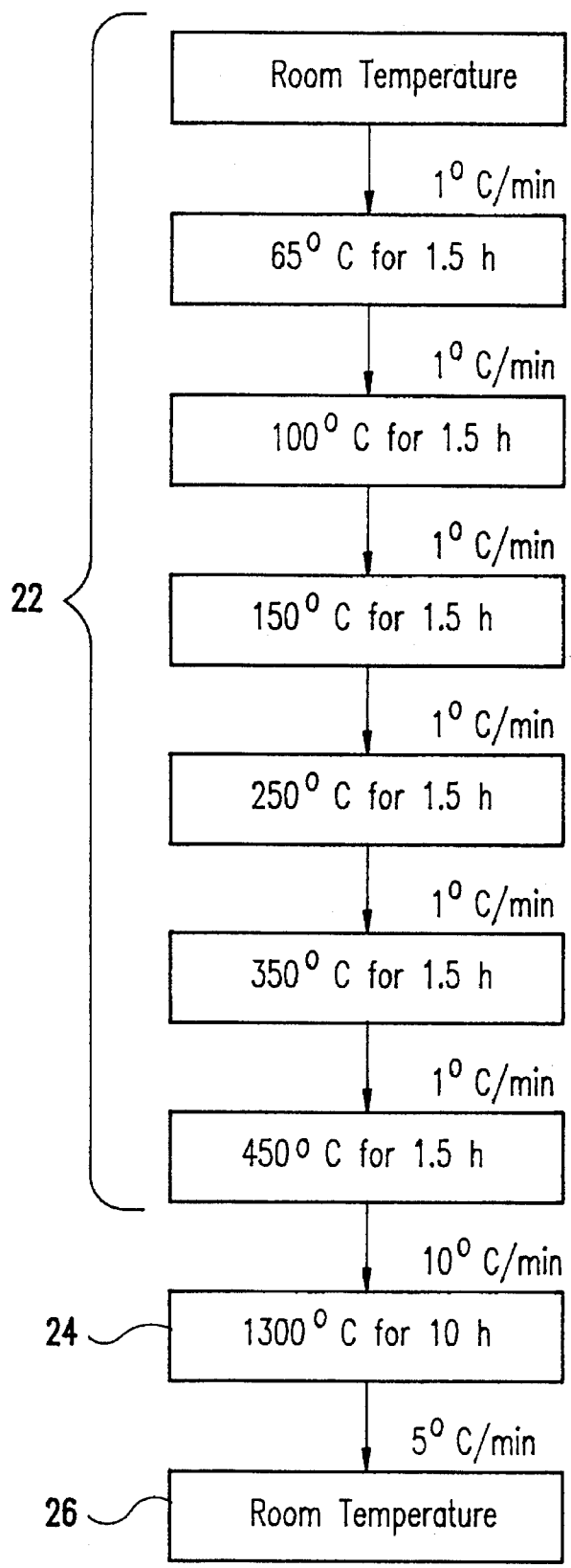
FIG. 2 is a schematic diagram showing the heat treatment process for converting the dip coated $Mg_xAl_{2-2x}Ti_{1+x}O_5$ ($x \leq 0.2$) into crystalline $Mg_xAl_{2-2x}Ti_{1+x}O_5$ ($x \leq 0.2$).

FIG. 2 shows a heat treatment process which has been successful in creating crack-free $Mg_xAl_{2-2x}Ti_{1+x}O_5$ ($x \leq 0.2$) films on substrates. In step 22, the $Mg_xAl_{2-2x}Ti_{1+x}O_5$ ($x \leq 0.2$) composition coated substrate is slowly brought to 450° C. in a stepwise fashion to drive off the organic species generated from the hydrolysis and condensation reactions without forming cracks or other imperfections in the coating. Ramping the heat at 1° C./min. with holds at several intermediate temperatures (e.g., 65° C., 100° C., 150° C., 250° C., and 350° C.) has been found to be a suitable evaporation cycle which avoids the formation of cracks and imperfections in the $Mg_xAl_{2-2x}Ti_{1+x}O_5$ ($x \leq 0.2$) coating. Once the heating cycle reaches 450° C., the substrate is coated with amorphous $Mg_xAl_{2-2x}Ti_{1+x}O_5$ ($x \leq 0.2$) and all organic constituents have been driven off. At step 24, the amorphous $Mg_xAl_{2-2x}Ti_{1+x}O_5$ ($x \leq 0.2$) coating is brought to a crystallization temperature (e.g., greater than 1000° C. and preferably approximately 1300° C.) and held at the crystallization temperature for a period of time (e.g., 10 hours) sufficient to convert the amorphous $Mg_xAl_{2-2x}Ti_{1+x}O_5$ ($x \leq 0.2$) to crystalline $Mg_xAl_{2-2x}Ti_{1+x}O_5$ ($x \leq 0.2$). After conversion of the coating to crystalline $Mg_xAl_{2-2x}Ti_{1+x}O_5$ ($x \leq 0.2$), step 26 indicates that the substrate is returned to room temperature by a slow cooling procedure (e.g., reduce temperature by 5° C./minute). Slow cooling reduces or avoids thermal stress problems at the substrate/coating interface.

It should be understood that the heat treatment cycle shown in FIG. 2 can be varied considerably by changing ramp rates, hold temperatures, duration of holds, etc. However, it is essential that the heat treatment used provide for calcination, with evaporation of water and the organic byproducts, conversion of the coating to the crystalline $Mg_xAl_{2-2x}Ti_{1+x}O_5$ ($x \leq 0.2$) form, and slow cooling to room temperature.

Results of X-ray diffraction analyses of SiC and $Si_3N_4$ specimens, both dense and porous, which were coated with the compositions of Table 1 by the coating procedure of FIG. 1 and which were subjected to heat treatment as shown in FIG. 2, indicated the formation of $Mg_xAl_{2-2x}Ti_{1+x}O_5$ ($x \leq 0.2$) without the formation of MgO, $Al_2O_3$ or $TiO_2$. The $Mg_xAl_{2-2x}Ti_{1+x}O_5$ ($x \leq 0.2$) is isostructural with $\beta$-$Al_2TiO_5$. Even after heat treatment at 850° C. for 500 hours, the crystalline $Mg_xAl_{2-2x}Ti_{1+x}O_5$ ($x \leq 0.2$) did not show signs of decomposition.

In the investigations, a dense substrate was defined as a body that contains no open pores and a porous substrate was defined as a body that contains open pores. Elemental mapping using energy dispersive x-ray (EDX) showed uniform distributions of Mg, Al and Ti on the outer surfaces of both the dense and the porous substrates. Scanning electron microscope (SEM) examination of the specimens revealed crack-free coatings on the outer surfaces of the substrates. Furthermore, SEM and EDX analyses of the interior sections of the porous substrates also showed the formation of a uniform, crack-free, $Mg_xAl_{2-2x}Ti_{1+x}O_5$ ($x \leq 0.2$) coating. Thus, the process described herein can be used to form uniform coatings on the interior open pore walls of a porous ceramic substrate without closing the open pores.

In addition, strength measurements of the SiC candle filter specimens after high temperature alkali corrosion tests showed that the $Mg_xAl_{2-2x}Ti_{1+x}O_5$ ($x \leq 0.2$) coated filters have higher crushing strength than uncoated filters.

The sequence in which the chemicals are combined and the pH of the mixture are important to the formation of a homogeneous $Mg_xAl_{2-2x}Ti_{1+x}O_5$ ($x \leq 0.2$) solution suitable for coating. To allow subsequent coating, the $Mg_xAl_{2-2x}Ti_{1+x}O_5$ ($x \leq 0.2$) solution needs to be free from precipitation and/or instant gelation. Solid precipitates tend to cause composition segregation in the solution, and rapid gelation makes a uniform coating impossible. When ethyl alcohol or water alone is added to the mixture of magnesium, aluminum and titanium precursors, precipitation or instant gelation occurs. As a result, the alcohol used to dilute the precursors needs to be pre-mixed with acid to a resultant pH between 1.0 and 4.5 before it is added to the precursors, and the addition of the pre-mixed alcohol should precede the addition of the water. When the pH of the alcohol acid solution is higher than 4.5, precipitation or instant gelation will also occur.

In addition, it has been found that the quality of the $Mg_xAl_{2-2x}Ti_{1+x}O_5$ ($x \leq 0.2$) coating is strongly dependent on the solution viscosity and the withdrawal rate. High viscosity and quick withdrawal rates will cause cracking of the coated film because of the drying stresses generated during heat treatment. In order to form a crack free coating, the solution viscosity should be kept below 6.2 cP. It has been found that the withdrawal rate cannot exceed 8.0 cm/min. for viscosities less than 4.6 cP, and that when the viscosity is higher than 4.6 cP, the withdrawal rate required for crack-free coating cannot exceed 4.1 cm/min.

The addition of the magnesium to the $\beta$-$Al_2TiO_5$ coating stabilizes the coating at low temperatures while maintaining the desired thermal and chemical properties of the $\beta$-$Al_2TiO_5$ coating. In addition, the coating process allows for easy coating and protection of a variety of substrates having arbitrary geometries. The process has demonstrated that crack-free $Mg_xAl_{2-2x}Ti_{1+x}O_5$ ($x \leq 0.2$) coatings can be formed on substrates that are on the order of 1 µm thick. In addition, experiments have shown that the $Mg_xAl_{2-2x}Ti_{1+x}O_5$ ($x \leq 0.2$) coatings can be successfully applied to porous materials without closing the pores, and therefore, the process can be used for filter material and catalyst applications.

While the invention has been described in terms of its preferred embodiments, those skilled in the art will recognize that the invention can be practiced with modification within the spirit and scope of the appended claims.

We claim:

1. A formulation, comprising:
   an acidified aqueous solution comprising water, alcohol, and acid, said acidified aqueous solution having a pH ranging between pH 1 and pH 4.5; and
   a mixture of magnesium, aluminum, and titanium precursors disposed within said acidified aqueous solution, said magnesium, aluminum, and titanium precursors being present at relative concentrations sufficient to produce $Mg_xAl_{2-2x}Ti_{1+x}O_5$ where x ranges between 0.001 and 0.2.

2. The formulation of claim 1 wherein said mixture of magnesium, aluminum, and titanium precursors are selected from the group consisting of metal alkoxides and metal nitrate hydrates.

3. The formulation of claim 2 wherein said magnesium precursor is $Mg(NO_3)_2 \cdot 6H_2O$, said aluminum precursor is $Al(C_2H_5CH(CH_3)O)_3$ and said titanium precursor is $Ti(CH_3(CH_2)_3O)_4$.

4. The formulation of claim 1 wherein a viscosity of said mixture of magnesium, aluminum, and titanium precursors disposed within said aqueous solution ranges from 1 to 6.2 cP.

5. The formulation of claim 2 wherein a water/alkoxide molar ratio of said mixture of magnesium, aluminum, and titanium precursors disposed within said acidified aqueous solution ranges from 1 to 10.

6. A method of coating a substrate with crystalline magnesium doped $\beta$-$Al_2TiO_5$ having the formula $Mg_xAl_{2-2x}Ti_{1+x}O_5$ where x ranges between 0.001 and 0.2, comprising the steps of:

applying to a surface of a substrate a sol gel formulation which comprises an acidified aqueous solution comprising water, alcohol, and acid, said acidified aqueous solution having a pH ranging between pH 1 and pH 4.5, and a mixture of magnesium, aluminum, and titanium precursors disposed within said acidified aqueous solution, said magnesium, aluminum, and titanium precursors being present at relative concentrations sufficient to produce $Mg_xAl_{2-2x}Ti_{1+x}O_5$ where x ranges between 0.001 and 0.2;

calcining said sol gel formulation below 500° C. to remove water and organic constituents and to form a coating of $Mg_xAl_{2-2x}Ti_{1+x}O_5$ where x ranges between 0.001 and 0.2; and crystallizing said coating above 1000° C. to produce a crystalline coating having the formula $Mg_xAl_{2-2x}Ti_{1+x}O_5$ where x ranges between 0.001 and 0.2.

7. The method of claim 6 wherein said applying step is performed by dip coating.

8. The method of claim 7 wherein said dip coating is performed with a withdrawal rate ranging from 2.2 cm/minute to 8.0 cm/minute when the sol gel formulation has a viscosity of less than 4.6 cP.

9. The method of claim 8 wherein said dip coating is performed with a withdrawal rate ranging from 2.2 cm/minute to 4.1 cm/minute.

* * * * *